United States Patent Office 3,197,472
Patented July 27, 1965

3,197,472
1,2-DICYANO-1,2-BIS(N,N-DISUBSTITUTED THIO-CARBAMYLTHIO)-ETHYLENES
Robert D. Vest, Wilmington, Del., assignor to E. I. du Pont de Nemours and Company, Wilmington, Del., a corporation of Delaware
No Drawing. Filed July 27, 1962, Ser. No. 212,998
10 Claims. (Cl. 260—247.1)

This invention relates to new esters of dithiocarbamic acids and to a process of preparing them.

The new compounds made available by this invention are 1,2 - dicyanovinylene - 1,2 - bis(dithiocarbamates), also referred to herein as 1,2-dicyano-1,2-bis(thiocarbamylthio)ethylenes, where each of the two thiocarbamyl nitrogen atoms is bound solely to carbon atoms. These compounds are represented by the formula

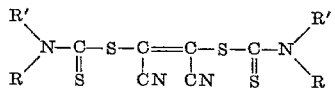

wherein each of R and R' contains up to 10 carbons and is hydrocarbon or hydrocarbon bearing a substituent of the group consisting of —OR", —CN, —OH and —COOR", R" being hydrocarbon of 1–6 carbons; and R and R' attached to the same nitrogen atom can together form a divalent alkylene or oxaalkylene group of 4–10 carbons.

The 1,2-dicyanovinylene-1,2-bis(dithiocarbamates) of this invention are prepared by reacting in solution a salt of an N,N-disubstituted dithiocarbamic acid and a cyclic cyanosulfide of formula $C_8N_4S_n$, where $n$, is 2 or 3, having the structure (I)
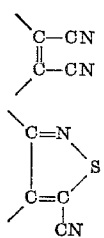

where Q represents one of the divalent radicals

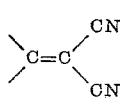

and

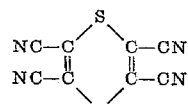

The reaction which takes place may be represented by the following equation, using tetracyano-1,4-dithiin as the cyclic cyanosulfide reactant:

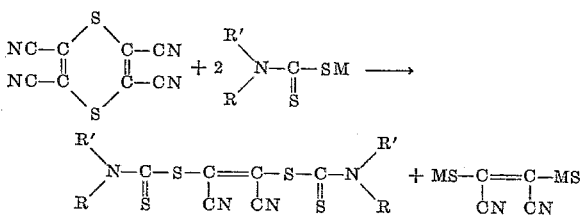

In this equation, the R and R' have the previously stated significance and M is a cation whose dithiocarbamic acid salt is at least partially soluble in the inert organic medium in which the reaction is conducted.

A similar reaction takes place with the other two cyanosulfides of Formula I, except that, with the second one, the coproduct is apparently a salt of 5-cyano-3,4-dimercaptoisothiazole; and that, with the third one, the coproduct is a salt of 1,1-dicyano-2,2-dimercaptoethylene rather than of dimercaptomaleonitrile (1,2-dicyano-1,2-dimercaptoethylene).

The cyclic cyanosulfides which serve as starting materials in the process of this invention are the following compounds:

A. Tetracyano-1,4-dithiin,

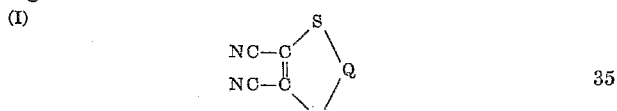

B. p-Dithiino-[c]-isothiazole-3,5,6-tricarbonitrile,

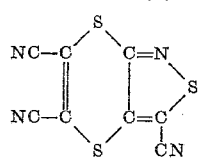

C. 4,5-dicyano - 1,3 - dithiole - $\Delta^{2,\alpha}$ - malononitrile, also called 2-dicyanomethylene-4,5-dicyano-1,3-dithiolene,

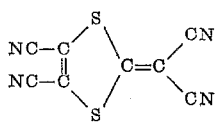

These various cyanosulfides can be prepared by the methods described below.

A. TETRACYANO-1,4-DITHIIN

This compound has been reported in the literature [G. Bähr, Angew. Chem. 70, 606–7 (1958)]. A very good method for its preparation is described in U. S. Patent 3,008,967 to Blomstrom and Smith. It can also be prepared by the method described under (B) below.

B. p-DITHIINO-[c]-ISOTHIAZOLE-3,5,6-TRICARBONITRILE

This product is obtained, together with tetracyano-1,4-dithiin, by reaction of disodium dimercaptomaleonitrile with 1,2-dichloro-1,2-dicyanoethylene. The latter is prepared by known methods (U. S. Patent 2,443,494) and it can be used either in the cis form (dichloromaleonitrile) or in the trans form (dichlorofumaronitrile). Disodium dimercaptomaleonitrile is described in the literature [Bähr and Schleitzer, Ber. 90, 438 (1957)].

A typical preparation is as follows:

To a stirred and cooled suspension of 22.2 g. of disodium dimercaptomaleonitrile in 350 ml. of 1,2-dimethoxyethane was added 17.4 g. of dichloromaleonitrile. An exothermic reaction occurred and the mixture became deep red in color. Stirring was continued at room temperature for 72 hours. The suspended solid material was collected by filtration and washed with a little 1,2-dimethoxyethane. This solid consisted largely of sodium chloride and sulfur. The filtrate was evaporated to dryness in a stream of nitrogen. The solid residue so obtained was extracted with 500 ml. of warm benzene, giving a solution and a crystalline residue sparingly soluble in benzene. Sublimation of the solid residue at 140–150° C. and 1 mm. pressure gave 6 g. of somewhat impure tetracyano-1,4-dithiin, M.P. 196–198° C. Recrystallization from hot benzene gave 5.5 g. of the essentially pure material, M. P. 207–208° C.

The benzene extract obtained as described above was evaporated to about half its original volume and cooled in ice. There was collected 10.2 g. of a yellow crystalline product, M.P. 174–176° C. An additional 3.1 g. of this product was obtained from the filtrates for a total yield of 13.3 g. Recrystallization of this material from benzene gave pure p-dithiino- [c] -isothiazole-3,5,6-tricarbonitrile as yellow needles, M.P. 181-182° C.

*Analysis.*—Calc'd for $C_8N_4S_3$: C, 38.69; N, 22.56; S, 38.74. Found: C, 39.46; N, 22.59; S, 38.58.

Spectral analysis of this product shows the following characteristic absorption bands:

Infrared: $4.49\mu$ (strong), $6.50\mu$ (strong), $6.70\mu$, $7.62\mu$ (strong), $8.60\mu$ (strong), $8.70\mu$, $8.90\mu$, $9.70\mu$, $10.0\mu$, $10.51\mu$, $12.17\mu$, and $12.32\mu$ (strong).

Ultraviolet -($\gamma_{max.}$ in $CH_2Cl_2$: 240 m$\mu$ ($\epsilon$= 11,400); 268 m$\mu$ ($\epsilon$=6950); 285 m$\mu$ ($\epsilon$=7950); 33 m$\mu$ ($\epsilon$=19,500); and a possible shoulder at 350 m$\mu$ ($\epsilon$=3850).

C. *4,5-Dicyano-1,3-dithiole-$\Delta^{2,\alpha}$-malononitrile*

This product is prepared by the reaction of 1,2-dichloro-1,2-dicyanoethylene [i.e., dichloromaleonitrile or dichlorofumaronitrile], with dipotassium (or disodium) 1,1-dicyano-2,2-dimercaptoethylene, in accordance with the equation:

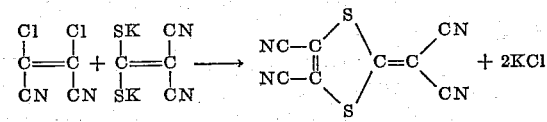

A typical preparation is as follows:

(1) DIPOTASSIUM 1,1-DICYANO-2,2-DIMERCAPTOETHYLENE

In a one-liter, three-neck flask fitted with a stirrer, thermometer, and dropping funnel was placed a solution of 60 g. of potassium hydroxide in 650 ml. of denatured ethyl alcohol. The solution was cooled to 0° C. and 35.4 g. (0.536 mole) of freshly distilled malononitrile was added all in one portion, followed by the dropwise addition of 41 g. of (0.54 mole) of carbon disulfide at 0–10° C. Toward the end of the addition, a canary-yellow salt began to percipitate. After stirring for one hour more at 0–5° C. the solid was collected on a filter and washed with 50 ml. of cold ethyl alcohol. After drying to constant weight at 80° C. and less than 1 mm. pressure, there was obtained 109 g. (94%) yield of dipotassium 1,1-dicyano-2,2-dimercaptoethylene as a yellow water-soluble solid which did not melt below 250° C.

*Analysis.*—Calc'd for $C_4N_2S_2K_2$: C, 22.01; S, 29.36. Found: C, 21.76; S, 29.23.

(2) 4,5-DICYANO-1,3-DITHIOLE-$\Delta^{2,\alpha}$-MALONONITRILE

To a solution of 2.50 g. (0.0115 mole) of dipotassium 1,1-dicyano-2,2-dimercaptoethylene in 50 ml. of methanol was added in one lot 1.47 g. (0.01 mole) of dichlorofumaronitrile at room temperature. After stirring for 15 minutes, the reaction mixture was poured into 300 ml. of water and the solid which precipitated was collected on a filter (1.12 g.). Recrystallization from hot toluene after treatment with decolorizing carbon yielded 0.99 g. of yellow needles, M.P. 208–209° C. This was shown by elemental and spectral analyses to be 4,5-dicyano-1,3-dithiole-$\Delta^{2,\alpha}$-malononitrile.

*Analysis.*—Calc'd for $C_8N_4S_2$: C. 44.43; S, 29.64. Found: C, 43.97; S, 30.01.

Further recrystallization from toluene gave a product of somewhat higher melting point (212–214° C.).

Of these three cyanosulfides, the preferred one for use in preparing the products of the invention is tetracyano-1,4-dithiin, which is readily prepared from inexpensive reactants (carbon disulfide, sodium cyanide and chlorine).

The second reactant in the process of this invention is a salt of an N,N-disubstituted dithiocarbamic acid, i.e., a compound of the formula

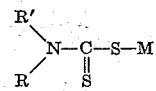

where R, R' and M are as previously defined. Suitable cations (M) are alkali metal and alkaline earth metal cations, the ammonium cation, and alkyl- and alkylene-substituted ammonium cations of the formula

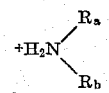

wherein each of $R_a$ and $R_b$ is alkyl of 1–6 carbons and $R_a$ and $R_b$ can together form an alkylene group ($-R_a-R_b-$) of 4–5 carbons. For example, the cation

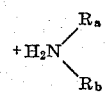

can correspond to the secondary amine used in preparing the dithiocarbamate reactant. Examples of such substituted ammonium cations include dimethylammonium, diethylammonium, diisopropylammonium, di-n-hexylammonium, pentamethyleneammonium, etc. For practical reasons, the preferred dithiocarbamates are those in which the cation is one of the alkali metals, especially sodium or potassium.

Since the thiocarbamyl portion

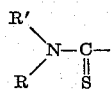

of the dithiocarbamate being used does not participate in the reaction and appears unchanged in the reaction product, any of the known dithiocarbamates can be used in the process. For example, R and R' can be monovalent (alike or different) hydrocarbon (alkyl, alkenyl, alkynyl, cycloalkyl, aryl groups or combinations of such groups, e.g., aralkyl, aralkenyl or alkaryl) of up to 10 carbons joined to the thiocarbamyl nitrogen through carbon, and any of these groups may bear an essentially inert substituent, i.e., a substituent that has substantially no tendency to react with the cyclic cyanosulfide under the operating conditions, the total number of carbons including the substituent being up to 10. Examples of such substituents are ether (—OR″), cyano (—CN), hydroxyl (—OH) and ester (—COOR″), R″ representing a hydrocarbon group of 1–6 carbon atoms, preferably alkyl.

For practical reasons of accessibility and cost, the preferred dithiocarbamates

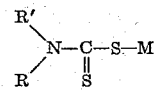

where the R's are monovalent groups, are those in which each of R and R' is hydrocarbon, e.g., alkyl of 1–10 carbon atoms, alkenyl or alkynyl of 3–10 carbon atoms, cycloalkyl of 5–10 carbon atoms, or aryl, aralkyl or alkaryl of 6–10 carbon atoms.

The dithiocarbamate reactant can also be one in which the thiocarbamyl nitrogen (again attached only to carbon atoms) is a member of a ring, R and R' being joined together. Dithiocarbamates of this type may be represented by the formula

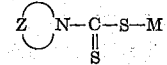

where Z contains 4–10 carbons and is an alkylene group or such a group in which one internal chain carbon atom is replaced by an oxygen atom, i.e., an oxaalkylene group. The most readily accessible, and therefore preferred, dithiocarbamates of this type are those where the divalent radical Z is alkylene of 4–5 chain carbon atoms and a total of 4–10 carbon atoms, 3-oxa-1,5-pentylene, or alkyl-substituted 3-oxa-1,5-pentylene having a total of 4–10 carbon atoms.

The preferred reaction products are those obtained from the more accessible dithiocarbamate reactants. They are therefore those having one of the formulas

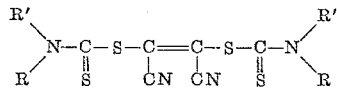

and

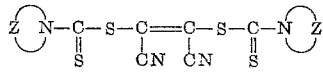

where R, R', and Z have the significance discussed in the two preceding paragraphs.

The relative proportions of the two reactants (cyclic cyanosulfide and salt of an N,N-disubstituted dithiocarbamic acid) are not critical. They are important only to the extent that it is desired to utilize the cyanosulfide as completely as possible and to avoid complications in the recovery of the reaction product. For these reasons, it is preferable, but not essential, to use at least two moles of the dithiocarbamate per mole of cyclic cyanosulfide. Most conveniently, the reactants are used in approximately stoichiometric amount, i.e., in 2:1 molar ratio.

The reaction is exothermic, and it can therefore take place at a very low external temperature, e.g., of the order of −50° C. The reaction temperature is not critical, but it is preferred to adjust the operating conditions, using external cooling if necessary, so that the temperature of the reaction mixture does not exceed about 100° C. In general, it is most convenient to operate at an internal temperature in the neighborhood of room temperature, e.g., in the range between about 10 and 50° C.

Since the reactants are solids, the reaction is normally conducted in an organic liquid medium which dissolves them to at least some extent, e.g., 2% by weight. Any solvent which is substantially inert towards the reactants and reaction product is suitable for this purpose. Examples of such reaction media include acyclic or cyclic ketones such as acetone, methyl ethyl ketone or cyclohexanone; acyclic or cyclic ethers such as di-n-butyl ether, 1,2-dimethoxyethane, 1,2-diethoxyethane, tetrahydrofuran or dioxane; alcohols such as methanol, butanol and cyclohexanol; nitriles such as acetonitrile, propionitrile, benzonitrile, or adiponitrile; alkanoic acid esters such as ethyl acetate, methyl propionate, methyl butyrate or ethyl benzoate; amides such as formamide, N,N-dimethylformamide, N,N-dimethylacetamide or tetramethylurea; nitro compounds such as nitromethane, nitroethane or nitrobenzene; sulfides, sulfoxides and sulfones such as diethyl sulfide, di-n-butyl sulfide, dimethyl sulfoxide, diethyl sulfoxide or tetramethylene cyclic sulfone; and the like. The reaction medium need not be anhydrous; in fact, it can contain considerable amounts of water. The preferred solvents, because their use facilitates the isolation of the reaction products, are those which are either miscible with water or readily volatile, i.e., boil below about 100° C. The amount of liquid diluent is immaterial provided it is sufficient to maintain the reactants in at least partial solution.

The two reactants can be mixed all at once with suitable provisions for dissipating the heat of reaction, but it is more convenient to add one to the other gradually in order to avoid excessive local heating. The order of addition is not critical but better yields are generally obtained when the cyclic cyanosulfide, in solution or as such, is added to the dithiocarbamate at least partly dissolved in the reaction medium.

The reaction product can be isolated in any suitable manner. A convenient procedure, when the reaction medium is miscible with water, consists in pouring the reaction mixture in water, which dissolves the dimercaptomaleonitrile derivative present in the mixture but precipitates the 1,2-dicyanovinylene-1,2-dithiocarbamate. If desired, the reaction medium can be partly or completely removed by evaporation prior to this treatment. Another procedure consists in removing the reaction medium, then extracting the residue with a suitable solvent which dissolves the reaction product but not the dimercaptomaleonitrile derivative. In either case, the reaction product can be purified by recrystallization, if necessary.

As can be seen from their structure, the dithiocarbamates of this invention present possibilities of cis-trans isomerism. In most cases, spectral or other evidence suggests that the product is preponderantly the trans isomer. However, no assumption regarding geometrical configuration will be made since the products are isomeric mixtures in many cases.

The following examples illustrate the invention.

EXAMPLE I

*1,2-dicyanovinylene-1,2-bis(dimethyldithiocarbamate)*

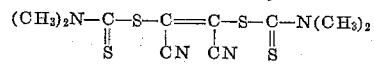

A solution of 21.6 g. (0.1 mole) of tetracyano-1,4-dithiin in 400 ml. of acetone was added over a period of 1.5 hours at room temperature to a stirred solution of 31.4 g. (0.22 mole) of potassium dimethyldithiocarbamate in 500 ml. of acetone. After an additional 1.5 hours at room temperature, the solvent was removed under reduced pressure. The residual thick paste was poured with vigorous stirring into 2 liters of water to give a yellow precipitate of 22.5 g. (71% yield) of crude 1,2-dicyanovinylene - 1,2 - bis(dimethyldithiocarbamate), also known as 1,2-dicyano-1,2-bis(N,N-dimethylthiocarbamylthio)ethylene. An analytical sample recrystallized from benzene melted at 164–165° C. (dec.).

*Analysis.*—Calc'd for $C_{10}H_{12}N_4S_4$: C, 37.95; H, 3.83; N, 17.71. Found: C, 38.6; H, 4.0; N, 16.51.

The infrared spectrum showed absorption bands at 3.42μ (CH), 4.5μ (C≡N, weak), 6.61μ (C=C) and other bands at 7.12, 7.25, 8.05, 8.70, 10.32, 11.55, and 12.50μ. The ultraviolet spectrum showed $\lambda_{max}$. (ethanol) at 273 mμ ($k=75.7$), 277 mμ ($k=55.9$) and shoulders at 330 mμ ($k=19.9$), and 400 mμ ($k=6.4$).

EXAMPLE II

*1,2-dicyanovinylene-1,2-bis(diethyldithiocarbamate)*

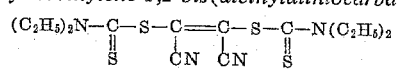

A solution of 4.32 g. (0.02 mole) of tetracyano-1,4-dithiin in 100 ml. of acetone was added dropwise over 30 minutes to a stirred solution of 9 g. (0.04 mole) of sodium diethyldithiocarbamate in 100 ml. of acetone at room temperature. After stirring for one additional hour, the solvent was removed by evaporation and the residue was extracted with refluxing benzene for 4 hours. The insoluble residue of this extraction was disodium dimercaptomaleonitrile. The benzene solution, after being concentrated and diluted with ethanol, afforded 4.05 g. (55% yield) of 1,2-dicyanovinylene-1,2-bis(diethyldithiocarbamate), also known as, 1,2-dicyano-1,2-bis(N,N-diethylthiocarbamylthio)ethylene, as a bright orange solid, M.P. 106–108° C. An analytical sample recrystallized from diethyl ether (in which it is very sparingly soluble) melted at 119.5–120° C.

*Analysis.*—Calc'd for $C_{14}H_{20}N_4S_4$: C, 45.13; H, 5.41; N, 15.04; S, 34.43. Found: C, 45.51; H, 5.78; N, 15.01; S, 34.40.

The infrared spectrum was in general similar to that of the product of Example I. The ultraviolet spectrum showed $\lambda_{max}$ (ethanol) at 241 m$\mu$ ($k$=56.2), 280 m$\mu$ ($k$=45.2), and shoulders at 390 m$\mu$ ($k$=7.8) and 325 m$\mu$ ($k$=16.7).

EXAMPLE III

*1,2-dicyanovinylene-1,2-bis(2,6-dimethyl-4-morpholinecarbodithioate)*

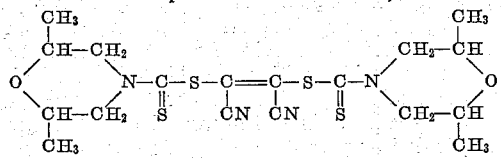

A solution of 10.8 g. (0.05 mole) of tetracyano-1,4-dithiin in 150 ml. of acetone was added dropwise over a 30-minute period at room temperature to a stirred suspension of 22.9 g. (0.1 mole) of potassium 2,6-dimethyl-4-morpholinecarbodithioate in 100 ml. of acetone. The resulting deep red solution was stirred for 45 minutes more and concentrated under reduced pressure to a thick paste. To this residue was added 400 ml. of water with vigorous stirring and the solid precipitate was removed by filtration, washed thoroughly with water and dried under reduced pressure. There was obtained 15.8 g. (69.5% yield) of 1,2-dicyanovinylene-1,2-bis(2,6-dimethyl-4-morpholinecarbodithioate), also known as 1,2-dicyano-1,2-bs(2,6 - dimethylmorpholinothiocarbonylthio)ethylene, as a bright yellow solid, M.P. 145–150° C. This product [which can also be called 1,2-dicyanovinylene-1,2-bis(2,4-dimethyl-3-oxa-1,5 - pentylenedithiocarbamate)] was purified by dissolving it in methylene dichloride, decolorizing the solution and diluting it with three volumes of petroleum ether (B.P. 30–60° C.). The product, obtained as bright yellow crystals, M.P. 151–154° C., was a mixture of geometric isomers, as shown by fractional crystallization from a dimethoxyethane/petroleum ether mixture, which afforded two fractions, A and B. Fraction A, M.P. 159–169° C., was shown to be the trans isomer by its infrared spectrum, which showed major absorptions at 6.72, 6.99, 8.0, 8.1, 8.55, and 9.5$\mu$, with a very weak C≡N absorption (4.48$\mu$) and no detectable C=C absorption at 6.35$\mu$.

*Analysis.*—Calc'd for $C_{16}H_{24}N_4O_2S_4$: C, 47.35; H, 5:30. Found: C, 47.85; H, 5.41.

Fraction B, M.P. 147–151° C., had an infrared spectrum in general very similar to that of Fraction A except that strong absorption bands were observed for C≡N (4.58$\mu$) and C=C (6.35$\mu$), characteristic of the cis isomers in this series. Its ultraviolet spectrum showed $\lambda_{max}$ (ethanol) at 388 m$\mu$ ($k$=15.5) and 264 m$\mu$ ($k$=22.1).

EXAMPLE IV

*1,2-dicyanovinylene-1,2-bis(diisopropyldithiocarbamate)*

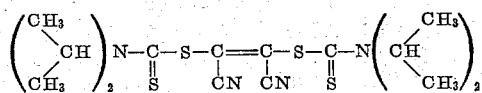

Following essentially the procedure of Example III, 21.3 g. (0.1 mole) of potassium diisopropyldithiocarbamate was reacted in acetone with 10.8 g. (0.05 mole) of tetracyano-1,4-dithiin. There was obtained 12.35 g. (58% yield) of 1,2-dicyanovinylene-1,2-bis(diisopropyldithiocarbamate), also known as 1,2-dicyano-1,2-bis(N,N-diisopropylthiocarbamylthio)ethylene, as a yellow solid melting at 112–116° C. The infrared spectrum of this product was consistent with the assigned structure.

EXAMPLE V

*1,2-dicyanovinylene-1,2-bis(1-piperidinecarbodithioate)*

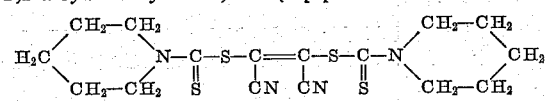

A mixture of 10.8 g. (0.05 mole) of tetracyano-1,4-dithiin and 19.9 g. (0.1 mole) of potassium 1-piperidinecarbodithioate in 150 ml. of acetone was stirred for 4 hours at room temperature. Removal of the solvent under reduced pressure gave a dark paste which was extracted with boiling benzene, leaving an insoluble residue of dipotassium dimercaptomaleonitrile. Concentrating and cooling the benzene extract afforded 15.3 g. (77% yield) of yellow crystals of 1,2-dicyanovinylene-1,2-bis(1-piperidinecarbodithioate), M.P. 155–161° C. After recrystallization from benzene, this product melted at 160–161° C.

*Analysis.*—Calc'd for $C_{16}H_{20}N_4S_4$: C, 48.47; H, 5.09; S, 32.35. Found: C, 48.94; H, 5.24; S, 32.58.

The infrared spectrum supported the assigned structure. This compound can also be called 1,2-dicyanovinylene-1,2-bis(1,5-pentylenedithiocarbamate), or 1,2-dicyano-1,2-bis-(piperidinothiocarbonylthio)ethylene.

EXAMPLE VI

*1,2-dicyanovinylene-1,2-bis(methylphenyldithiocarbamate)*

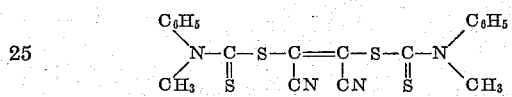

A solution of 10.8 g. (0.05 mole) of tetracyano-1,4-dithiin in 100 ml. of acetonitrile was added slowly to a suspension of 22.1 g. (0.1 mole) of potassium methylphenyldithiocarbamate in 100 ml. of acetone at room temperature, after which the reaction mixture was stirred for 4 hours. After removal of the solvents under reduced pressure, the pasty reaction product was extracted with hot benzene. The dithiocarbamate has, however, limited solubility in this solvent since this operation left 31 g. of insoluble residue and the benzene extracts afforded only 1.2 g. of 1,2-dicyanovinylene-1,2-bis(methylphenyldithiocarbamate), also known as 1,2-dicyano-1,2-bis(N - methyl-N-phenylthiocarbamylthio)ethylene, M.P. 194–196° C. The above insoluble residue was then washed with ethyl acetate, followed by extraction with water, which removed the dipotassium dimercaptomaleonitrile, leaving an additional 14.64 g. of 1,2-dicyanovinylene-1,2-bis(methylphenylidthiocarbamate). An analytical sample was recrystillized from toluene to give bright yellow crystals, M.P. 199–202° C. with decomposition.

*Analysis.*—Calc'd. for $C_{20}H_{16}N_4S_4$: C, 51.51; H, 3.66. Found: C, 54.95; H, 3.38.

The infrared spectrum was consistent with the assigned structure.

EXAMPLE VII

The product of Example I was prepared from 4,5-dicyano-1,3-dithiole-$\Delta^{2,\alpha}$-malononitrile as follows:

A solution of 2.16 g. (0.01 mole) of 4,5-dicyano-1,3-dithiole-$\Delta^{2,\alpha}$-malononitrile in 50 ml. of acetone was added dropwise at room temperature to a stirred suspension of 3.18 g. (0.02 mole) of potassium dimethyldithiocarbamate in 100 ml. of acetone, after which the mixture was stirred for 1.5 hours. The solvent was removed under reduced pressure and the residual brown oil was stirred with 50 ml. of water, which dissolved the potassium salt of 1,2-dicyano-1,2-dimercaptoethylene and left 1.1 g. (35% yield) of crude 1,2-dicyano-1,2-bis(dimethyldithiocarbamate), also known as 1,2-dicyano-1,2-bis(N,N-dimethylthiocarbamylthio)ethylene. After recrystallization from benzene, comparison of the infrared spectra showed that this compound was the same as that obtained in Example I.

EXAMPLE VIII

The product of Example I was prepared from p-dithiino-[c]-isothiazole-3,5,6-tricarbonitrile as follows:

To a stirred solution of 3.18 g. (0.02 mole) of potassium dimethyldithiocarbamate in 250 ml. of acetone was added 2.48 g. (0.01 mole) of p-dithiino-[c]-isothiazole-3,5,6-tricarbonitrile. After stirring for two days at room temperature, the solvent was removed under reduced pressure. The dark residue was extracted with boiling benzene, leaving a benzene-insoluble material, presumably the salt of 5 - cyano - 3,4 - dimercaptoisothiazole. Evaporation of the benzene extract afforded an oily residue which did not crystallize but which was shown to consist chiefly of 1,2-dicyanovinylene-1,2-bis(dimethyldithiocarbamate) by its infrared spectrum (major absorptions at 3.40, 4.5, 6.69, 7.29, 8.0, 8.7, and 10.2μ).

A number of representative compounds of this invention have been described in the foregoing examples. These examples, however, are merely illustrative, since the invention embraces broadly the 1,2-dicyanovinylene-1,2 - bis(N,N - disubstituted dithiocarbamates). Other compounds of the invention which can be prepared, in accordance with the described methods, by reacting a cyanosulfide as defined above (preferably tetracyano-1,4-dithiin) with a dithiocarbamate salt

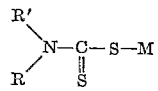

as defined above, are listed below as further illustrative examples. These compounds all fall under the general formula

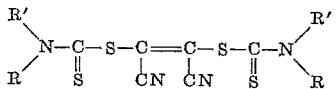

where R and R' (which can be joined together to form a divalent radical) have the previously stated significance. For the sake of brevity, only the various

groups are named in the following list:

| —N(R')(R) Group | —N(R')(R) Group |
|---|---|
| Dibutylamino. | Ethyl (4-isopropenylphenyl)amino. |
| Diisoamylamino. | Bis(2-propoxyethyl)amino. |
| Bis(2-ethylhexyl)amino. | Ethyl (6-methoxyhexyl)amino. |
| Didecylamino. | Ethyl (p-methoxyphenyl)amino. |
| Isopropylmethylamino. | Butyl (2-cyanoethyl)amino. |
| Diallylamino. | (2-Cyanoethyl)cyclohexylamino. |
| Methyl (4-pentenyl)amino. | Bis(2-hydroxyethyl)amino. |
| Methyl (1,1-dimethyl-2-propynyl)amino. | (5-Hydroxypentyl)methylamino. |
| Isopropyl (1,1-dimethyl-2-propynyl)amino. | (o-Hydroxyphenyl)methylamino. |
| Dicyclopentylamino. | (3-Carbomethoxypropyl)methylamino. |
| Di(β-naphthyl)amino. | (2-Carbohexoxyethyl)ethylamino. |
| Butylphenylamino. | (2-Carbethoxyethyl)phenylamino. |
| Allylphenylamino. | 1-Pyrrolidyl. |
| Dibenzylamino. | 2,5-Dimethyl-1-pyrrolidyl. |
| Diphenethylamino. | 2-Isobutyl-1-pyrrolidyl. |
| Benzylmethylamino. | 2,6-Diethyl-1-piperidyl. |
| Ethyl (m-tolyl)amino. | 2-Amyl-1-piperidyl. |
| Phenyl (p-tolyl)amino. | 4-Morpholinyl. |
| Dixylylamino. | 2-Ethyl-4-morpholinyl. |
| Cinnamylmethylamino. | 2,6-Dipropyl-4-morpholinyl. |

The 1,2-dicyanovinylene-1,2-bis(N,N-disubstituted dithiocarbamates) are, as a class, effective accelerators of the vulcanization of natural and butadiene-styrene copolymer rubbers. This valuable property is unexpected and surprising since it is completely lacking in a related compound, 1,2 - dicyano-1,2-bis(N,N-dimethylcarbamylthio)ethylene, which has been reported in the patent literature (German Patent 1,060,655, Example 18). This compound has the formula

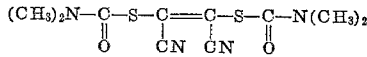

and therefore differs from the products of this invention only in that it contains carbonyl rather than thiocarbonyl groups. However, it was found to be wholly ineffective as an accelerator in vulcanization tests (ASTM Method D412–51T) conducted on sythetic rubber (25/75 styrene/butadiene copolymer), whereas the 1,2 - dicyanovinylene-1,2-bis(dithiocarbamates) illustrated in the foregoing examples gave excellent results in the same tests.

In addition to their utility as rubber vulcanization accelerators, the products of this invention, which are all brightly colored, are useful as dyes for natural and synthetic fibers. As an example, a solution of 20 mg. of 1,2 - dicyanovinylene - 1,2-bis(dimethyldithiocarbamate) in a small amount of acetone was added to 20 ml. of water containing 20 mg. of a commercial sulfonated liquid dispersing agent, and the resulting dispersion was diluted to a volume of 100 ml. with water. Test fabrics were immersed in this dye bath, which was then heated at 95–100° C. for one hour. The fabrics were removed and washed well with soap and water. In this manner, nylon and wool were dyed a tan color and rayon was dyed brown.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

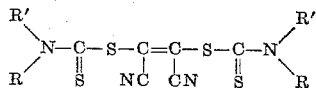

where each of R and R' taken singly has up to 10 carbons and is selected from the group consisting of hydrocarbon and hydrocarbon bearing a substituent selected from the group consisting of —OR", —CN, —OH and —COOR", R" being alkyl of 1–6 carbons, and R and R' attached to the same nitrogen together form a divalent group selected from the class consisting of alkylene and oxaalkylene of 4–10 carbons.

2. 1,2-dicyano-1,2-bis(N,N-dimethylthiocarbamylthio)-ethylene.

3. 1,2-dicyano - 1,2-bis(N,N-diethylthiocarbamylthio)-ethylene.

4. 1,2 - dicyano - 1,2 - bis(2,6-dimethylmorpholinothiocarbamylthio)ethylene.

5. 1,2 - dicyano - 1,2 - bis(N,N - diisopropylthiocarbamylthio)-ethylene.

6. 1,2 - dicyano - 1,2 - bis(piperidinothiocarbonylthio)-ethylene.

7. 1,2 - dicyano - 1,2 - bis(N - methyl - N - phenylthiocarbamylthio)-ethylene.

8. A process of preparing 1,2-dicyano-1,2-bis-(thiocarbamylthio)ethylenes which comprises reacting a salt of the formula

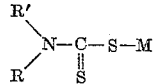

where each of R and R' taken singly has up to 10 carbons and is selected from the group consisting of hydrocarbon and hydrocarbon bearing a substituent selected from the group consisting of —OR", —CN, —OH, and —COOR", R" being alkyl of 1–6 carbons, R and R' joined together form a divalent group selected from the class consisting of alkylene and oxaalkylene of 4–10 carbons, and M is selected from the group consisting of an alkali metal cation, an alkaline earth metal cation, the ammonium cation, and a substituted ammonium cation of the formula

where each of $R_a$ and $R_b$ taken singly is alkyl of 1–6 carbons, and $R_a$ and $R_b$ together form an alkylene group of 4–5 carbons, with a cyclic cyanosulfide selected from the group consisting of tetracyano-1,4-dithiin, p-dithiino-[c]-isothiazole - 3,5,6 - tricarbonitrile and 4,5 - dicyano - 1,3-dithiole-$\Delta^{2,\alpha}$-malononitrile, in an inert organic medium which is at least a partial solvent for the salt and cyclic cyanosulfide.

9. A process of claim 8 conducted at a temperature —50° C. to 100° C.

10. A process of claim 8 wherein the cyclic cyanosulfide is tetracyano-1,4-dithiin.

References Cited by the Examiner

UNITED STATES PATENTS

| 2,792,394 | 5/57 | Himel et al. | 260—247.1 |
| 3,047,546 | 7/62 | Lober et al. | 260—247.1 |

FOREIGN PATENTS

| 1,060,655 | 7/59 | Germany. |

NICOLAS S. RIZZO, *Primary Examiner.*

UNITED STATES PATENT OFFICE
CERTIFICATE OF CORRECTION

Patent No. 3,197,472

July 27, 1965

Robert D. Vest

It is hereby certified that error appears in the above numbered patent requiring correction and that the said Letters Patent should read as corrected below.

Column 10, line 46, for "carbamylthio" read -- carbonylthio --.

Signed and sealed this 8th day of March 1966.

(SEAL)
Attest:

ERNEST W. SWIDER
Attesting Officer

EDWARD J. BRENNER
Commissioner of Patents